US012335711B2

(12) United States Patent
Jin et al.

(10) Patent No.: US 12,335,711 B2
(45) Date of Patent: Jun. 17, 2025

(54) MULTIFUNCTIONAL SOUNDING DEVICE

(71) Applicant: AAC Microtech (Changzhou) Co., Ltd., Jiangsu (CN)

(72) Inventors: Xin Jin, Changzhou (CN); Fan Zhang, Changzhou (CN); Ronglin Linghu, Changzhou (CN); Wei Song, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 241 days.

(21) Appl. No.: 18/342,685

(22) Filed: Jun. 27, 2023

(65) Prior Publication Data

US 2024/0147164 A1 May 2, 2024

Related U.S. Application Data

(63) Continuation of application No. PCT/CN2022/134612, filed on Nov. 28, 2022.

(30) Foreign Application Priority Data

Oct. 28, 2022 (CN) ........................ 202222871604.6

(51) Int. Cl.
*H04R 9/04* (2006.01)
*H04R 9/02* (2006.01)
*H04R 9/06* (2006.01)

(52) U.S. Cl.
CPC ............. *H04R 9/046* (2013.01); *H04R 9/025* (2013.01); *H04R 9/045* (2013.01); *H04R 9/066* (2013.01)

(58) Field of Classification Search
CPC ........ H04R 9/046; H04R 9/025; H04R 9/045; H04R 9/066
USPC ....... 381/412, 401, 396, 421, 182, 186, 386, 381/420, 117, 398, 177, 361, 150
See application file for complete search history.

(56) References Cited

FOREIGN PATENT DOCUMENTS

CN 213126461 * 5/2021

* cited by examiner

*Primary Examiner* — Norman Yu
(74) *Attorney, Agent, or Firm* — Wiersch Law Group

(57) ABSTRACT

The present disclosure provides a multifunctional sounding device, which includes a housing body with a containment space, and a sounding unit. The housing body is provided with a sound outlet. The sounding unit includes a frame, a vibration system, and a magnetic circuit system. The multifunctional sounding device also includes a motor assembly accommodated in the containment space. The motor assembly includes a vibration unit having a driving coil. The driving coil is positioned on the side of the first auxiliary magnetic circuit away from the vibration system. The main magnetic circuit and the second auxiliary magnetic circuit are fixed to the vibration unit. The first auxiliary magnetic circuit is fixed to the housing body. Compared with related technologies, the multifunctional sounding device in the present disclosure has a small overall thickness and volume, and has excellent acoustic performance.

10 Claims, 4 Drawing Sheets

MULTIFUNCTIONAL SOUNDING DEVICE

TECHNICAL FIELD

The present disclosure relates to the field of electroacoustic transducers, especially to a multifunctional sounding device.

BACKGROUND ART

With the advent of the mobile Internet era, the number of smart mobile devices continues to rise. Among the many mobile devices, the mobile phone is undoubtedly the most common and portable mobile terminal device. At present, the functions of mobile phones are extremely diverse, including high-quality music functions and vibration functions. Therefore, the sounding device for having vibration functions and playing sounds is widely used in current smart mobile devices.

The sounding device in the related art includes a housing body, a sounding unit accommodated in the housing body, and a vibration system of a motor. The sounding unit includes a frame, a vibration system fixed on the frame, and a magnetic circuit system with the magnetic gap which is also fixed on the frame. The vibration system of the motor is pasted on the side of the magnetic circuit system away from the vibration system.

Meanwhile, the sounding unit and the vibration system of the motor in the sounding device in the related art can be independently controlled. However, since the vibration system of the motor is stacked under the sounding unit, the thickness of the sounding device increases, making it difficult to reduce the thickness of the sounding device. In addition, the sounding unit and the magnets of the vibration system of the motor are not on the same plane, and the driving forces of the respective magnetic fields interfere and affect each other, and the weight counterweight is bulky, which wastes material costs. At the same time, the volume is too large to be miniaturized, so that the acoustic performance and vibration performance of the sounding device are poor.

Therefore, it is really necessary to provide a new the multifunctional sounding device to solve the above technical problems.

SUMMARY OF THE INVENTION

The present disclosure is to provide a multifunctional sounding device with small overall thickness, small volume and excellent acoustic performance.

In order to achieve the objective mentioned above, the present disclosure provides a multifunctional sounding device including: a housing body with a containment space; a sound outlet penetrating the housing body; a sounding unit accommodated in the containment space, including a frame, a vibration system and a magnetic circuit system having a magnetic gap for driving the vibration system to vibrate and produce sound; and a motor assembly accommodated in the containment space. The motor assembly includes a vibration unit arranged on a side of the magnetic circuit system away from the vibration system and an elastic member suspending the vibration unit in the containment space.

The magnetic circuit system includes a main magnetic circuit, a first auxiliary magnetic circuit and a second auxiliary magnetic circuit respectively surrounding the main magnetic circuit and forming the magnetic gap with the main magnetic circuit. The vibration unit includes a driving coil positioned on a side of the first auxiliary magnetic circuit away from the vibration system. The main magnetic circuit and the second auxiliary magnetic circuit are fixed to the vibration unit; the first auxiliary magnetic circuit is fixed to the housing body.

As an improvement, the magnetic circuit system is rectangular, and two of the first auxiliary magnetic circuits are positioned on opposite sides of a short axis of the main magnetic circuit; two of the second auxiliary magnetic circuits are positioned on opposite sides of a long axis of the main magnetic circuit.

As an improvement, the main magnetic circuit includes a main magnet, a main pole plate stacked and fixed on the side of the main magnet close to the vibration system, and a lower plate fixed to the side of the main magnet away from the vibration system; the main pole plate and the lower plate are respectively fixed on opposite sides of the main magnet; the second auxiliary magnetic circuit includes a second auxiliary magnet, and a second auxiliary pole plate stacked and fixed to the second auxiliary magnet.

As an improvement, the first auxiliary magnetic circuit includes a first auxiliary magnet, and a first auxiliary pole plate stacked and fixed on the first auxiliary magnet; one end of the first auxiliary pole plate is fixed to a side of the first auxiliary magnet close to the vibration system, the other end of the first auxiliary pole plate is fixed to the housing body.

As an improvement, the second auxiliary magnetic circuit is fixed on the side of the lower plate close to the vibration system; the lower plate is fixed to the vibration unit.

As an improvement, the vibration unit further includes a weight with two opposite sides connected to the elastic members along a vibration direction of the vibration unit; the two driving coils are respectively fixed to the weight and spaced apart from each other.

As an improvement, the weight includes a weight body, a mounting groove formed by inward depression from a side of the weight body close to the sound outlet, and two side walls formed by extending from opposite sides of the weight body towards the sounding unit respectively; the driving coil is fixedly arranged in the mounting groove.

As an improvement, the elastic members are respectively arranged on opposite sides of the weight along the vibration direction of the vibration unit.

As an improvement, the vibration system includes a diaphragm fixed on the frame, and a voice coil inserted in the magnetic gap for driving the diaphragm to vibrate; the diaphragm is fixed on the housing body and is arranged opposite to the sound outlet.

As an improvement, the motor assembly further includes a flexible conductive connector electrically connected to the driving coil; the flexible conductive connector includes a fixed part fixed on a side of the vibration unit away from the diaphragm, an elastic arm extended from the fixed part bend, and an extension part passing through the housing body and at least partially exposed at the housing body.

Compared with related technologies, in the multifunctional sounding device of the present disclosure, the magnetic circuit system is arranged through the sounding unit. The magnetic circuit system includes a main magnetic circuit, a first auxiliary magnetic circuit and a second auxiliary magnetic circuit respectively surrounding the main magnetic circuit and forming a magnetic gap by space with the main magnetic circuit. The multifunctional sounding device also includes a motor assembly accommodated in the containment space. The motor assembly includes a vibration unit arranged on the side of the magnetic circuit system away from the vibration system and an elastic member suspending the vibration unit in the containment space. The vibration unit includes a driving coil, and the driving coil is positioned on a side of the first auxiliary magnetic circuit away from the vibration system. The main magnetic circuit and the second auxiliary magnetic circuit are fixed to the vibration unit. The first auxiliary magnetic circuit is fixed to the housing body. Therefore, when the driving coil is energized, the first auxiliary magnetic circuit and the main magnetic circuit fixed to the housing body simultaneously provide driving force for the driving coil. The magnetic gap between the center magnetic circuit in the vibration direction of the driving coil and the inner diameter of the voice coil increases, and part of the driving force of the sounding device will be lost, but the area of the lower plate will increase. The gap between the lower plate and the driving coil is reduced, which can make up part of the driving force of the sounding device. At the same time, the glued area increases, and the magnetic circuit's ability to resist drop deformation is enhanced. Thereby, the magnetic circuit of the motor can be saved, the volume can be released for the containment space of the multifunctional sounding device, and the cost of parts and assembly can be reduced.

DETAILED DESCRIPTION OF EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
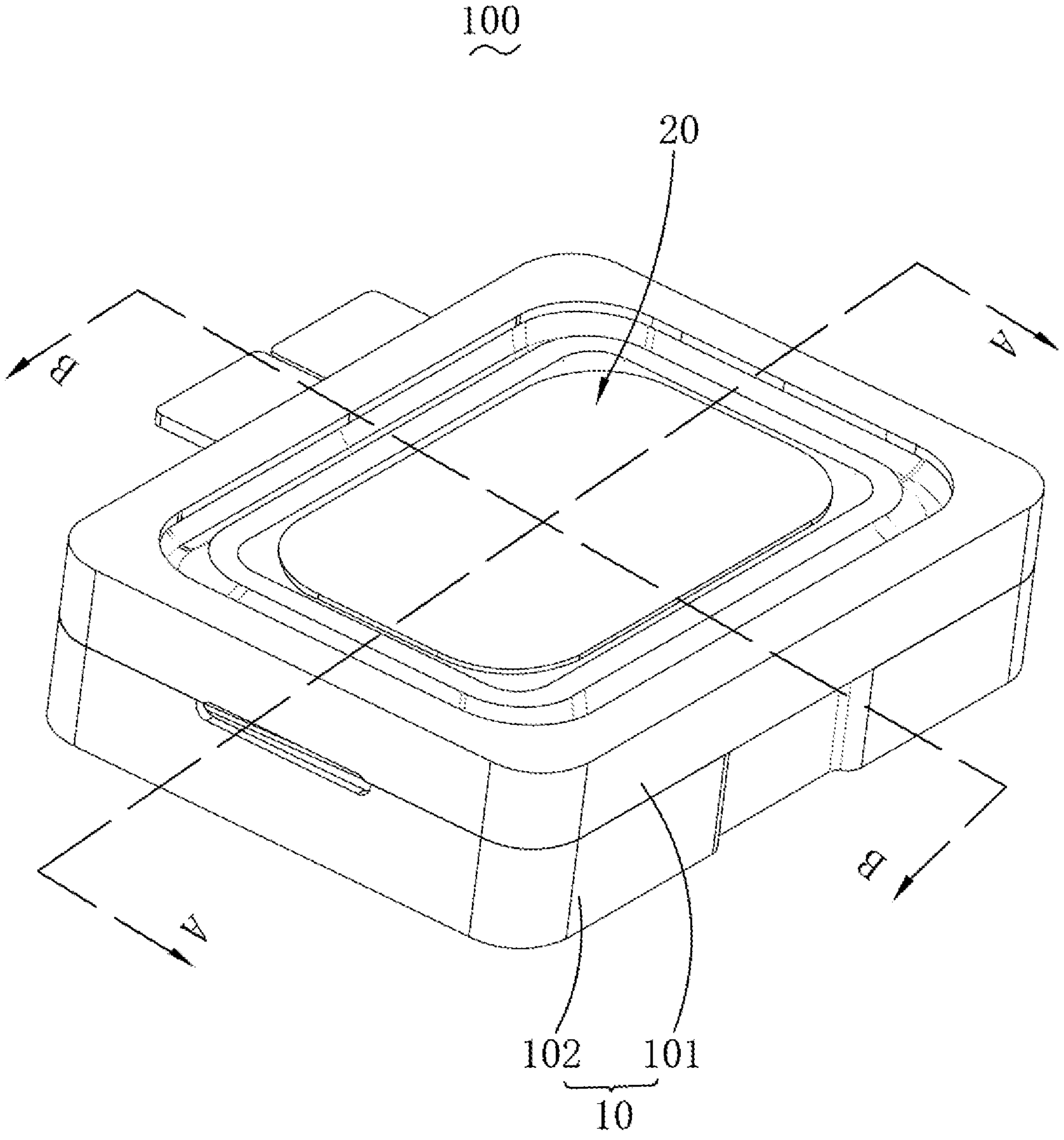
FIG. 1 is an isometric view of a multifunctional sounding device in accordance with an exemplary embodiment of the present disclosure.
Figure 2:
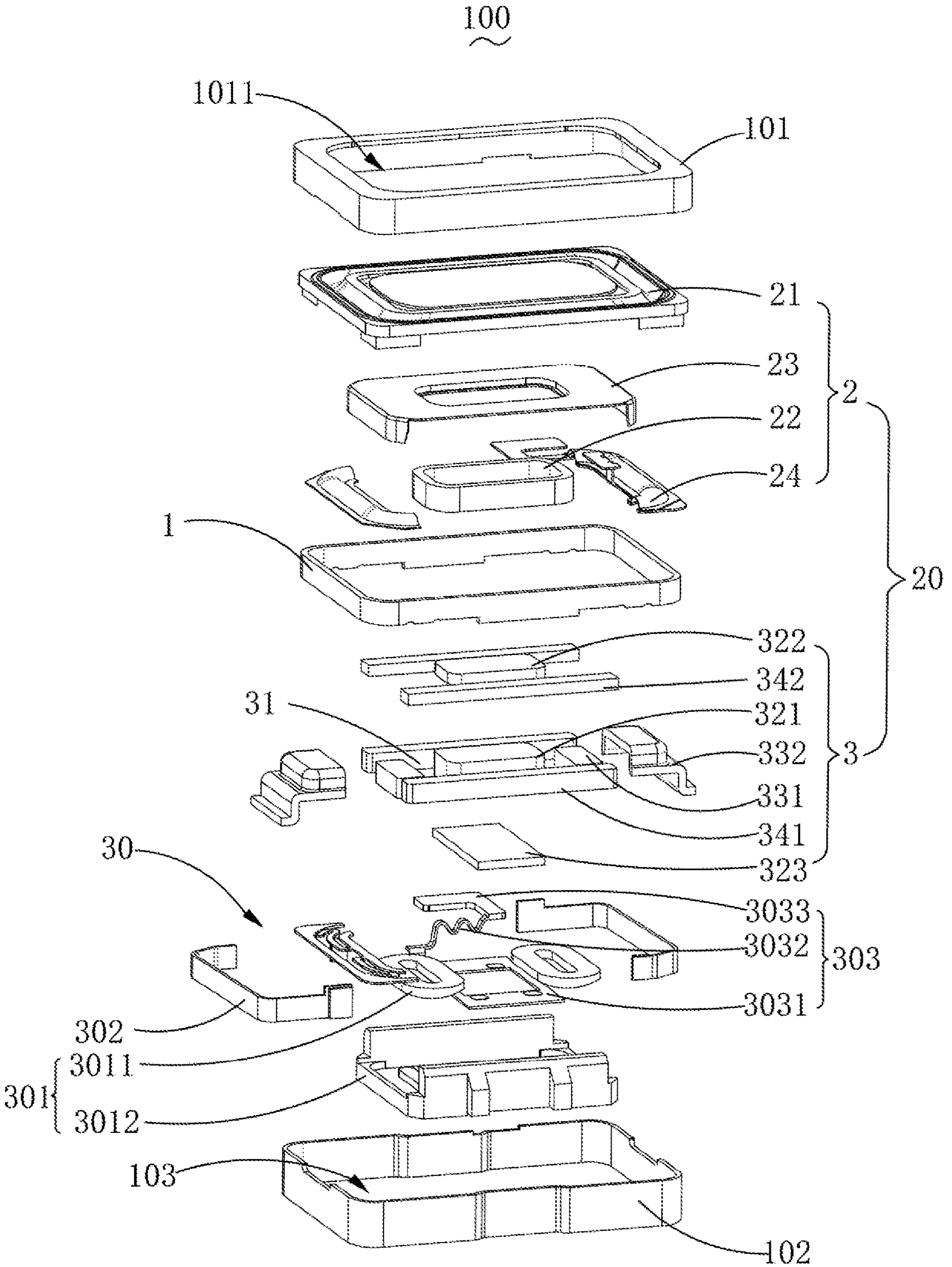
FIG. 2 is an exploded view of the multifunctional sounding device in FIG. 1.
Figure 3:
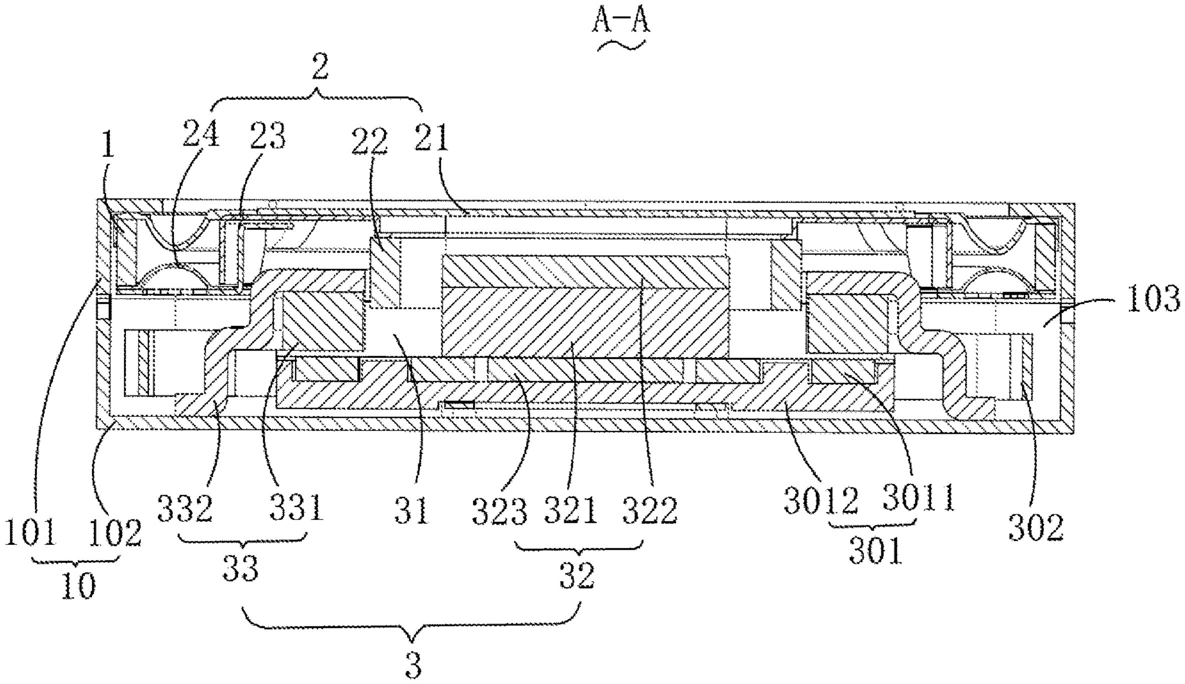
FIG. 3 is a cross-sectional view of the multifunctional sounding device taken along AA line in FIG. 1.
Figure 4:
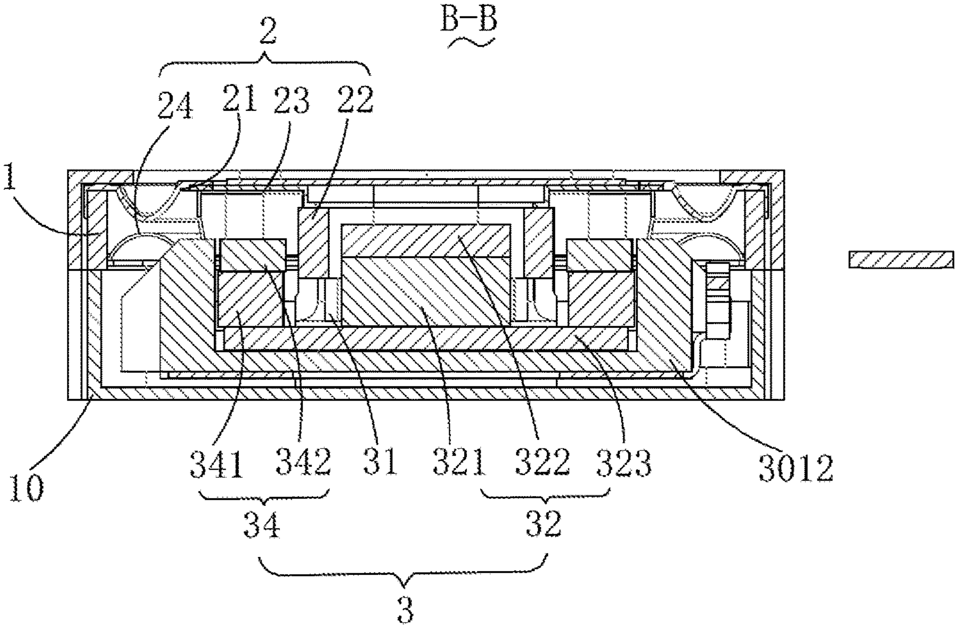
FIG. 4 is a cross-sectional view of the multifunctional sounding device taken along BB line in FIG. 1.
Figure 5:
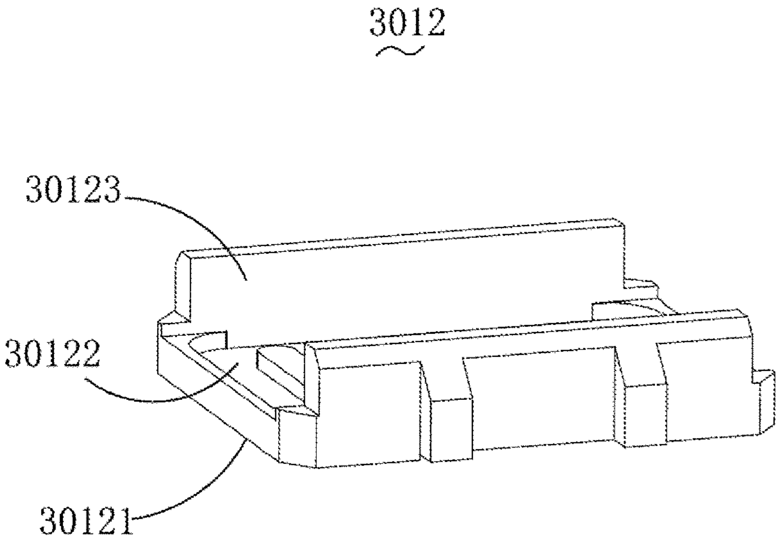
FIG. 5 is an isometric view of a weight of the multifunctional sounding device.
Figure 6:
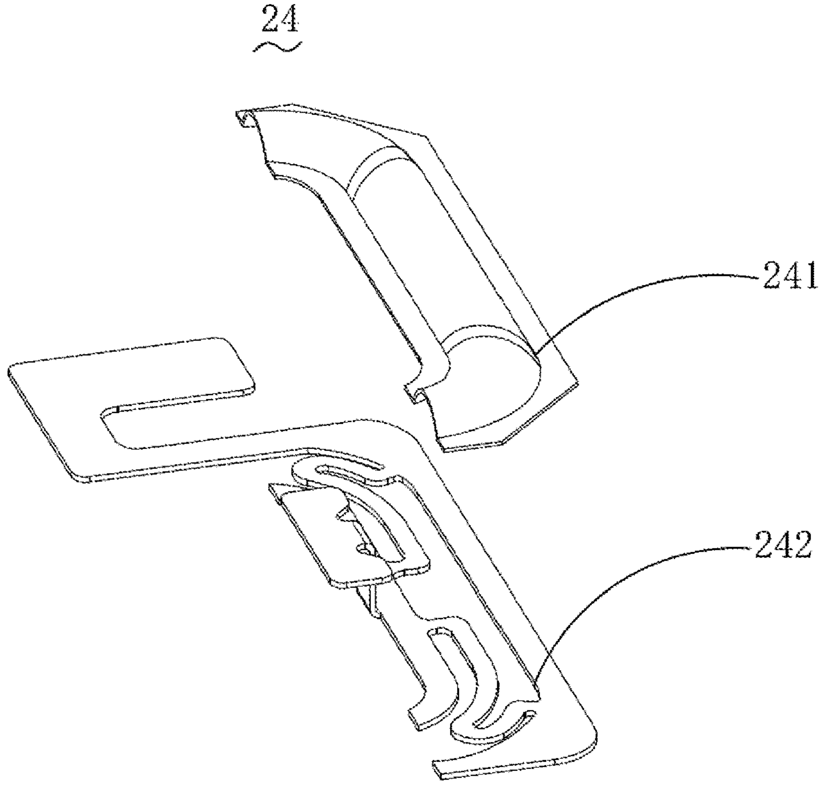
FIG. 6 illustrates an elastic support assembly of the multifunctional sounding device.

Referring to FIGS. 1-6, the present disclosure provides a multifunctional sounding device 100. The multifunctional sounding device 100 includes a housing body 10 with a containment space 103 and a sounding unit 20 accommodated in the containment space 103. The housing body 10 is provided with a sound outlet 1011 penetrating therethrough. The sounding unit 20 includes a frame 1, a vibration system 2, and a magnetic circuit system 3 with the magnetic gap 31 and driving the vibration system 2 to vibrate and produce sound. The magnetic circuit system 3 includes a main magnetic circuit 32 and a first auxiliary magnetic circuit 33 and a second auxiliary magnetic circuit 34 respectively surrounding the main magnetic circuit 32 and forming the magnetic gap 31 spaced apart from the main magnetic circuit 32.

The multifunctional sounding device 100 also includes a motor assembly accommodated in the containment space 103. The motor assembly 30 includes a vibration unit 301 arranged on the side of the magnetic circuit system 3 away from the vibration system 2 and an elastic member 302 suspending the vibration unit 301 in the containment space 103. The vibration unit 301 includes a driving coil 3011. The driving coil 3011 is positioned on the side of the first auxiliary magnetic circuit 33 away from the vibration system 2. The main magnetic circuit 32 and the second auxiliary magnetic circuit 34 are fixed to the vibration unit 301. The first auxiliary magnetic circuit 33 is fixed to the housing body 10.

In this embodiment, the housing body 10 includes an upper cover 101 and a lower cover 102 covering the upper cover 101. The upper cover 101 and the lower cover 102 jointly enclose the containment space 103. The structure of the upper cover 101 and the lower cover 102 is beneficial to the assembly of the multifunctional sounding device 100.

The housing body 10 is provided with a sound outlet 1011 penetrating therethrough, specifically, the sound outlet 1011 is arranged by penetrating the upper cover 101. The sound outlet 1011 connects the containment space 103 with the outside world. The sounding unit 20 transmits the sound to the outside through the sound outlet 1011.

In this embodiment, the vibration system 2 includes a diaphragm 21 fixed on the frame 1 and a voice coil 22 inserted in the magnetic gap 31 and driving the diaphragm 21 to vibrate. The diaphragm 21 is attached and fixed to the housing body 10 and is set opposite to the sound outlet 1011. The diaphragm 21 and the housing body 10 together form the containment space 103. Optionally, the diaphragm 21 is pasted and fixed on the upper cover 101.

In this embodiment, the magnetic circuit system 3 is rectangular. Two of the first auxiliary magnetic circuits 33 are positioned on opposite sides of the short axis of the main magnetic circuit 32. Two of the second auxiliary magnetic circuits 34 are positioned on opposite sides of the long axis of the main magnetic circuit 32. Two of the first auxiliary magnetic circuits 33 and two of the second auxiliary magnetic circuits 34 respectively surround the main magnetic circuit 32 and are separated from the main magnetic circuit 32 to form the magnetic gap 31.

In this embodiment, the main magnetic circuit 32 includes a main magnet 321, a main pole plate322 stacked and fixed on the side of the main magnet 321 close to the vibration system2, and a lower plate 323 fixed on the side of the main magnet 321 away from the vibration system2. The main pole plate 322 and the lower plate 323 are respectively fixed on opposite sides of the main magnet 321. The second auxiliary magnetic circuit 34 includes a second auxiliary magnet 341, and a second auxiliary pole plate 342 stacked and fixed on the second auxiliary magnet 341.

In this embodiment, the first auxiliary magnetic circuit 33 includes a first auxiliary magnet 331 and a first auxiliary pole plate 332 stacked and fixed on the first auxiliary magnet 331. One end of the first auxiliary pole plate 332 is fixed on the side of the first auxiliary magnet 331 close to the diaphragm 21. The other end of the first auxiliary pole plate 332 is fixed to the housing body 10. Specifically, one end of the first auxiliary pole plate 332 is fixed to the first auxiliary magnet 331, and the other end is fixed to the lower cover 102. That is, the first auxiliary magnet 331 is fixed to the housing body 10 through the first auxiliary pole plate 332.

The first auxiliary magnet 331 and the second auxiliary magnet 341 respectively surround the main magnet 321 and are separated from the main magnet 321 to form the magnetic gap 31. This structure is beneficial to improve the driving force of the magnetic circuit of the magnetic gap 31.

The main pole plate 322, the first auxiliary pole plate 332 and the second auxiliary pole plate 342 are stacked and fixed on the main magnet 321, the first auxiliary magnet 331 and the second auxiliary magnet 341 respectively. This structure increases the density of the magnetic circuit on both sides of the magnetic gap 31, which is conducive to improving the driving force of the magnetic circuit of the magnetic gap 31, thereby making the acoustic performance of the multifunctional sounding device 100 of the present disclosure good.

In this embodiment, the second auxiliary magnetic circuit 34 is fixed on the side of the lower plate 323 close to the vibration system 2. The lower plate 323 is fixed on the vibration unit 301, that is, the main magnetic circuit 32 and the second auxiliary magnetic circuit 34 are both fixed to the vibration unit 301. Specifically, the second auxiliary magnet 341 is fixed on the lower plate 323. This structure enables the main magnetic circuit 32 and the second auxiliary magnetic circuit 34 to be used to counterweight the motor assembly 30 so as to increase the vibration amplitude of the motor assembly 30. This makes the motor assembly 30 output higher acceleration, thereby improving the vibration performance of the multifunctional sounding device 100 of the present disclosure.

In this embodiment, the vibration unit 301 also includes a weight 3012. The elastic member 302 is respectively fixed on opposite sides of the weight 3012 along the vibration direction of the vibration unit 301. The driving coil 3011 includes two. Two of the driving coils 3011 are respectively fixed on the weight 3012 and spaced from each other.

The weight 3012 is used as a counterweight to increase the weight of the vibration unit 301, so as to increase the vibration amplitude of the vibration unit 301. This makes the motor assembly 30 output higher acceleration, thereby improving the vibration performance of the multifunctional sounding device 100 of the present disclosure. By arranging the main magnetic circuit 32 and the second auxiliary magnetic circuit 34 on the weight 3012 to form a part of the weight for motor vibration, the counterweight of the weight 3012 can be lowered, and part of the volume of the weight 3012 can be released. In a BOX with the same external volume, the volume released by the weight 3012 can be converted into the cavity of the containment space 103 of the multifunctional sounding device 10, which is beneficial to the performance improvement of the multifunctional sounding device 100. In addition, the weight of the weight 3012 is reduced, which is beneficial to save the material cost of the weight 3012. The inner magnet of the multifunctional sounding device 100 and the short-side magnet of the magnetic circuit simultaneously provide driving force for the coil of the motor simultaneously. This can save the magnetic circuit of the motor, release the volume for the containment space 103 of the multifunctional sounding device 100, and reduce the cost of parts and assembly.

Specifically, the elastic member 302 is respectively fixed on opposite sides of the weight 3012 along the vibration direction of the vibration unit 301. The driving coil 3011 is fixed to the weight 3012.

In this embodiment, the weight 3012 includes a weight body 30121, a mounting groove 30122 formed by indenting the side of the weight body 30121 close to the sound outlet 1011, and two side walls 30123 formed by extending opposite sides of the weight body 30121 close to the sounding unit respectively. The side wall 30123 is correspondingly arranged on the other side of the main magnetic circuit 32. The driving coil3011 is cooperating and fixedly arranged in the mounting groove 30122.

Specifically, the lower plate 323 is fixed on the weight body 30121, that is, both the main magnetic circuit 32 and the second auxiliary magnetic circuit 34 are fixed on the weight body 30121. Optionally, the second auxiliary magnet 341 is fixedly connected to the side wall 30123. The second auxiliary magnet 341 and the main magnet 321 are partially fixed on the side of the driving coil 3011 close to the vibration system 2. The driving coil 3011 is arranged under the first auxiliary magnetic circuit 33 without contact, and the first auxiliary magnetic circuit 33 is fixed on the housing body 10. When the driving coil 3011 is energized, the first auxiliary magnetic circuit 33 and the main magnetic circuit 32 fixed on the housing body 10 provide driving force for the driving coil 3011 at the same time. The magnetic gap 31 between the center magnetic circuit in the vibration direction of the driving coil 3011 and the inner diameter of the voice coil 22 increases, and part of the driving force of the sounding device 100 will be lost. However, the area of the lower plate 323 increases, so that the gap between the lower plate 323 and the driving coil 3011 decreases, which can make up part of the driving force of the sounding device 100. At the same time, the glued area increases, and the magnetic circuit's ability to resist drop deformation is enhanced. Thereby, the magnetic circuit of the motor can be saved, the volume can be released for the multifunctional sounding device 100 and the containment space 103, and the cost of components and assembly cost can be reduced.

In this embodiment, the vibration system 2 further includes a skeleton 23 fixed to the diaphragm 21, and an elastic support assembly 24 spaced apart from the diaphragm 21. The voice coil 22 is suspended in the magnetic gap 31 through the skeleton 23. The elastic support assembly 24 is arranged on the same side as the first auxiliary magnetic circuit 33. The elastic support assembly 24 is fixed to the frame 1. The other end of the elastic support assembly 24 is fixed to the skeleton 23. The voice coil 22 is inserted in the magnetic gap 31 and drives the diaphragm 21 to vibrate and produce sound. The skeleton 23 is fixed to the voice coil 22, so that the voice coil 22 has good stability when driven.

The elastic support assembly 24 and the diaphragm 21 are spaced apart. The elastic support assembly 24 is fixed to the frame 1. Wherein, the elastic support assembly 24 includes two. Two of the elastic support assemblies 24 are positioned on opposite sides of the short axis of the frame 1, respectively. Two of the elastic support assemblies 24 symmetrically distributed support the voice coil 22 more stably and have good vibration reliability. The other end of the elastic support assembly 24 is fixed to the skeleton 23. The elastic support assembly 24 is used to strengthen the vibration effect of the diaphragm 21, to improve the acoustic performance of the multifunctional sounding device 100, also to balance the swing of the vibration system 2, to improve the Describe the stability of the multifunctional sounding device 100.

In this embodiment, the elastic support assembly 24 includes an auxiliary diaphragm 241 fixed to the skeleton 23 and a circuit board 242 fixed to the auxiliary diaphragm 241. The voice coil 22 can be electrically connected to an external circuit through the circuit board 242 to realize independent control of the sounding unit 20. On the one hand, this structure is used to improve the vibration intensity and balance of the vibration system 2, and to suppress swinging. On the other hand, the voice coil 22 is led out to connect to an external power supply, avoiding the risk of the voice coil lead being easily broken when the lead wire structure of the voice coil is leading out the power supply.

In this embodiment, the elastic member 302 includes at least two and are respectively arranged on opposite sides of the weight 3012 along the vibration direction of the vibration unit 301. Wherein, the elastic member 302 is a spring in U-shape or C-shape. In this embodiment, the elastic member 302 is a U-shaped spring.

In this embodiment, the motor assembly 30 further includes a flexible conductive connector 303 electrically connected to the driving coil 3011. The flexible conductive connector 303 includes a fixed part 3031 fixed on the side of the weight 3012 away from the diaphragm 21, an elastic arm3032 extended by the fixed part3031 bend, and an extension part 3033 passing through the housing body 10 and at least partially exposed to the housing body 10. The elastic arm 3032 acts as the vibrating strength arm in the flexible conductive connector 303, when the fixed part 3031 fixed to the vibration unit 301 moves, the vibration is damped and not transmitted to the extension part3033 through the connection of the elastic arm3032 which can vibrate the strength arm. The part of the extension part 3033 passing through the housing body 10 is provided with a welded pad for welding, so as to realize the transmission of external electrical signals to the driving coil 3011, so as to realize the independent control of the motor assembly 30. Specifically, the flexible conductive connector 303 is the flexible circuit board, which has good elasticity and excellent electrical conductivity.

Compared with related technologies, in the multifunctional sounding device of the present disclosure, the magnetic circuit system is arranged through the sounding unit. The magnetic circuit system includes a main magnetic circuit, a first auxiliary magnetic circuit and a second auxiliary magnetic circuit respectively surrounding the main magnetic circuit and forming a magnetic gap by space with the main magnetic circuit. The multifunctional sounding device also includes a motor assembly accommodated in the containment space. The motor assembly includes a vibration unit arranged on the side of the magnetic circuit system away from the vibration system and an elastic member suspending the vibration unit in the containment space. The vibration unit includes a driving coil. The driving coil is positioned on the side of the first auxiliary magnetic circuit away from the vibration system. The main magnetic circuit and the second auxiliary magnetic circuit are fixed to the vibration unit. The first auxiliary magnetic circuit is fixed to the housing body. Therefore, when the driving coil is energized, the first auxiliary magnetic circuit and the main magnetic circuit fixed to the housing body provide driving force for the driving coil at the same time, and the magnetic gap between the center magnetic circuit in the vibration direction of the drive coil and the inner diameter of the voice coil increases. The driving force of the sounding device will be lost partially but the area of the lower plate is increased, so that the gap between the lower plate and the driving coil is reduced, which can make up for part of the driving force of the sounding device. At the same time, the glued area increases, and the magnetic circuit's ability to resist drop deformation is enhanced. Thereby, the magnetic circuit of the motor can be saved, the volume can be released for the containment space of the multifunctional sounding device, and the cost of parts and assembly can be reduced.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A multifunctional sounding device including:

a housing body with a containment space;

a sound outlet penetrating the housing body;

a sounding unit accommodated in the containment space, including a frame, a vibration system and a magnetic circuit system having a magnetic gap for driving the vibration system to vibrate and produce sound;

a motor assembly accommodated in the containment space, including a vibration unit arranged on a side of the magnetic circuit system away from the vibration system and an elastic member suspending the vibration unit in the containment space; wherein the magnetic circuit system includes a main magnetic circuit, a first auxiliary magnetic circuit and a second auxiliary magnetic circuit respectively surrounding the main magnetic circuit and forming the magnetic gap with the main magnetic circuit;

the vibration unit includes a driving coil positioned on a side of the first auxiliary magnetic circuit away from the vibration system; and the main magnetic circuit and the second auxiliary magnetic circuit are fixed to the vibration unit; the first auxiliary magnetic circuit is fixed to the housing body.

2. The multifunctional sounding device as described in claim 1, wherein, the magnetic circuit system is rectangular, and two of the first auxiliary magnetic circuits are positioned on opposite sides of a short axis of the main magnetic circuit; two of the second auxiliary magnetic circuits are positioned on opposite sides of a long axis of the main magnetic circuit.

3. The multifunctional sounding device as described in claim 2, wherein, the main magnetic circuit includes a main magnet, a main pole plate stacked and fixed on the side of the main magnet close to the vibration system, and a lower plate fixed to the side of the main magnet away from the vibration system; the main pole plate and the lower plate are respectively fixed on opposite sides of the main magnet; the second auxiliary magnetic circuit includes a second auxiliary magnet, and a second auxiliary pole plate stacked and fixed to the second auxiliary magnet.

4. The multifunctional sounding device as described in claim 3, wherein, the first auxiliary magnetic circuit includes a first auxiliary magnet, and a first auxiliary pole plate stacked and fixed on the first auxiliary magnet; one end of the first auxiliary pole plate is fixed to a side of the first auxiliary magnet close to the vibration system, the other end of the first auxiliary pole plate is fixed to the housing body.

5. The multifunctional sounding device as described in claim 3, wherein, the second auxiliary magnetic circuit is fixed on the side of the lower plate close to the vibration system; the lower plate is fixed to the vibration unit.

6. The multifunctional sounding device as described in claim 3, wherein, the vibration unit further includes a weight with two opposite sides connected to the elastic members along a vibration direction of the vibration unit; the two driving coils are respectively fixed to the weight and spaced apart from each other.

7. The multifunctional sounding device as described in claim 6, wherein, the weight includes a weight body, a mounting groove formed by inward depression from a side of the weight body close to the sound outlet, and two side walls formed by extending from opposite sides of the weight body towards the sounding unit respectively; the driving coil is fixedly arranged in the mounting groove.

8. The multifunctional sounding device as described in claim 7, wherein, the elastic members are respectively arranged on opposite sides of the weight along the vibration direction of the vibration unit.

9. The multifunctional sounding device as described in claim 1, wherein, the vibration system includes a diaphragm fixed on the frame, and a voice coil inserted in the magnetic gap for driving the diaphragm to vibrate; the diaphragm is fixed on the housing body and is arranged opposite to the sound outlet.

10. The multifunctional sounding device as described in claim 9, wherein, the motor assembly further includes a flexible conductive connector electrically connected to the driving coil; the flexible conductive connector includes a fixed part fixed on a side of the vibration unit away from the diaphragm, an elastic arm extended from the fixed part bend, and an extension part passing through the housing body and at least partially exposed at the housing body.

* * * * *